United States Patent
Cocos

(10) Patent No.: US 7,873,377 B1
(45) Date of Patent: Jan. 18, 2011

(54) BACKGROUND SCAN PROCESS FOR WIRELESS DEVICES

(75) Inventor: Costin Cocos, Malsch (DE)

(73) Assignee: Marvell International Ltd., Hamilton (BM)

( * ) Notice: Subject to any disclaimer, the term of this patent is extended or adjusted under 35 U.S.C. 154(b) by 705 days.

(21) Appl. No.: 11/894,179

(22) Filed: Aug. 20, 2007

Related U.S. Application Data

(60) Provisional application No. 60/823,197, filed on Aug. 22, 2006.

(51) Int. Cl.
*H04Q 7/20* (2006.01)
(52) U.S. Cl. .......... 455/515; 455/552.1; 455/553.1; 455/422.1; 455/434; 455/426.1; 370/310; 370/312; 370/313; 370/338; 370/329
(58) Field of Classification Search .......... 455/515, 455/507, 500, 517, 434, 550.1, 552.1, 553.1, 455/422.1, 403, 466, 426.1, 426.2, 414.1–414.4, 455/432.1, 432.2, 575.1, 556.1, 556.2; 370/310, 370/312, 313, 338, 329, 328
See application file for complete search history.

(56) References Cited

U.S. PATENT DOCUMENTS

| 7,245,877 | B2 * | 7/2007 | Liu et al. ............ 455/62 |
| 2005/0198337 | A1 * | 9/2005 | Sun et al. ............ 709/230 |
| 2007/0109990 | A1 * | 5/2007 | Bennett ............ 370/328 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages, no date available.
802.11n; IEEE P802.11-04/0889r6; Wireless LANs, TGn Sync Proposal Technical Specification; May 2005; 131 pages.

* cited by examiner

*Primary Examiner*—Keith T Ferguson

(57) ABSTRACT

A method and system for implementing a background scan in a wireless device having at least two independent radio interfaces is disclosed. Aspects of the exemplary embodiment include using a first one of the radio interfaces for transferring data with an access point; and simultaneously using a second one of the radio interfaces for receiving scan data to search for a new access point.

20 Claims, 4 Drawing Sheets

BACKGROUND SCAN PROCESS FOR WIRELESS DEVICES

CROSS-REFERENCE TO RELATED APPLICATIONS

This application claims the benefit of provisional Patent Application Ser. No. 60/823,197, filed Aug. 22, 2006, assigned to the assignee of the present application, and incorporated herein by reference.

BACKGROUND

In a wireless network, a wireless access point connects wireless communication devices together to form the wireless network. The access point usually connects to a wired network, and can relay data between wireless devices and wired devices. Several access points can link together to form a larger network that allows a user of a wireless device to roam between access points without the connection being dropped.

802.11 is an IEEE (Institute of Electrical and Electronics Engineers) standard for wireless area networks. 802.11 wireless devices typically have a mode for transmitting and receiving data traffic, and a mode for scanning for available access points during a process called background scanning. Up until 2004, 802.11 wireless devices had a single antenna (some devices had two antennas, but there was only one set of components to process the signal, or RF chain).

Because a 802.11 wireless device has a single antenna, in order to perform a background scan, the device has to stop transferring data over a data channel, switch to a scan channel, and then perform the background scan by transferring scan data over the scan channel for short periods time (e.g., a couple of milliseconds) to detect available access points. After the background scan is completed, the device has to switch back to the data channel, and restart the transmitter to transfer data traffic. The stopping and starting of data traffic to perform a background scan negatively influences the data throughput of the wireless device, since the wireless device is not able to send or receive during this scanning period.

802.11 task group N (TGn) has recently proposed an 802.11n standard that has the goal of increasing the peak data throughput transmitted by a wireless multiple-input/multiple-output (MIMO) device to 100 Mbps. The basis of MIMO operation is to provide 11n devices with multiple radio interfaces to allow the devices to send data on different channels at the same time in order to achieve greater transmit/receive data rates than the pre-11n devices. In its present form, the 802.11n standard is silent as to how background scanning should be implemented. Using the traditional background scan process in which all data traffic is temporarily suspended would be counterproductive to the goal of the proposed 802.11n standard of increasing throughput. Accordingly, it would be desirable to provide an improved background scan process for use in multi-radio equipped wireless devices.

BRIEF SUMMARY OF THE INVENTION

The present invention provides a method and system for implementing a background scan in a wireless device having at least two independent radio interfaces. Aspects of the exemplary embodiment include using a first one of the radio interfaces for transferring data with an access point; and simultaneously using a second one of the radio interfaces for receiving scan data to search for a new access point.

According to the method and system disclosed herein, wireless devices are no longer required to entirely stop data traffic in order to perform a background scan, thereby minimizing the negative effects on data throughput caused by the background scan to just a decrease in the data rate, rather than a complete cessation of data traffic.

DETAILED DESCRIPTION OF THE INVENTION

The present invention relates to an improved background scan process for wireless devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The preferred embodiment provides an improved background scan process for use in wireless communication devices having at least two independent radio interfaces. The exemplary embodiment takes advantage of the presence of the two independent radio interfaces to transfer data traffic and background scan traffic in parallel.

The exemplary embodiments will be described in terms of an 802.11n standard multiple-input/multiple-output (MIMO) device that has multiple radio interfaces for sending data on different channels at the same time. However, one with ordinary skill in the art will readily recognize that the exemplary embodiments may be used with any type of wireless communication device that has at least two independent radio interfaces. The exemplary embodiments will also be described in the context of particular methods having certain steps. However, the method and system operate effectively for other methods having different and/or additional steps not inconsistent with the exemplary embodiments.

Figure 1:
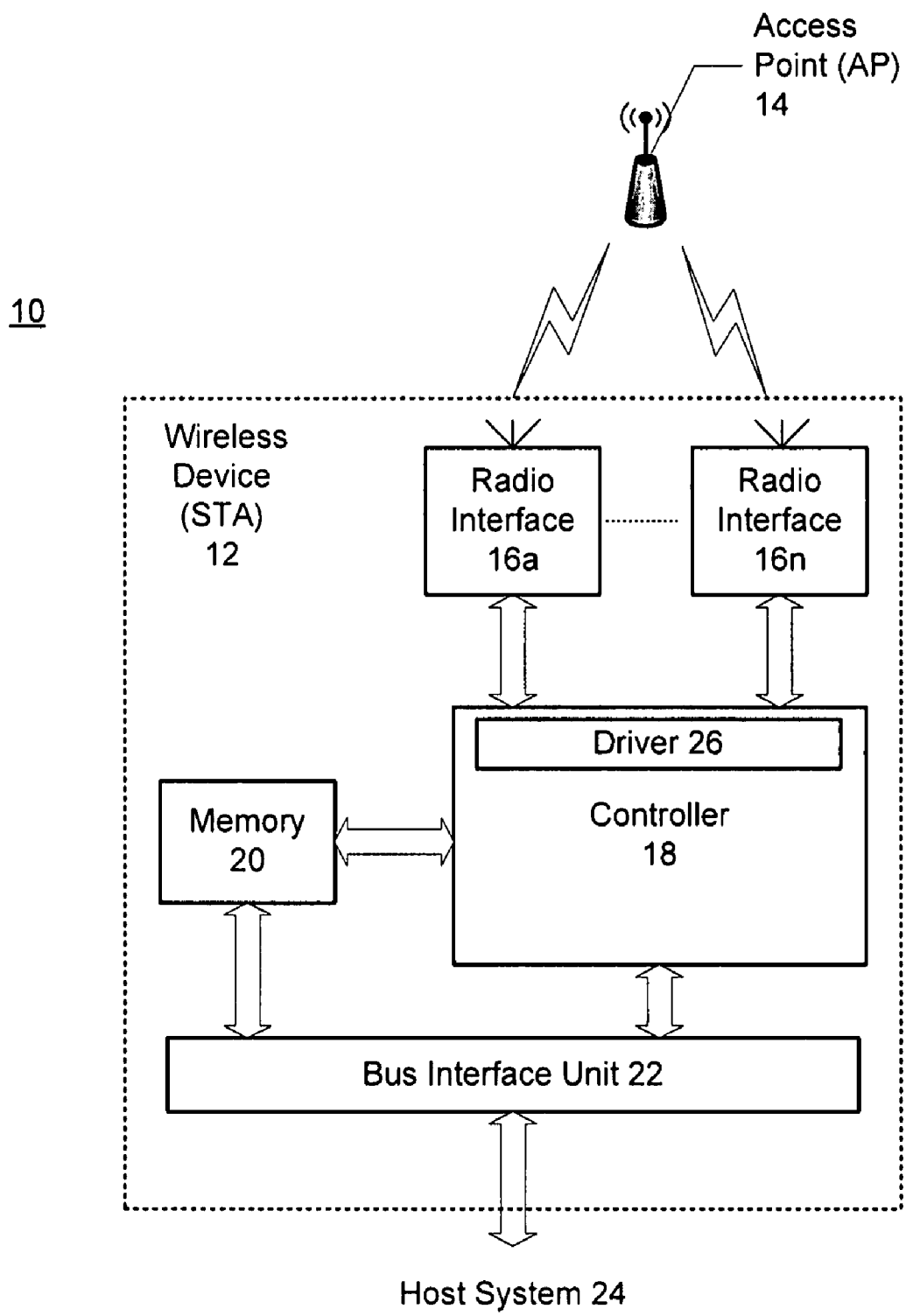
FIG. 1 is a block diagram illustrating an exemplary wireless communication system.

FIG. 1 is a block diagram illustrating an exemplary wireless communication system. The wireless communication system 10 includes a wireless device 12 that wirelessly communicates with an access point (AP) 14. In one exemplary embodiment, the wireless device 12 comprises a MIMO device. In addition, the wireless device 12 may be a network device or client station (STA) used in a desktop/portable computer for communication. The access point 14 is the device that connects wireless devices 12 together to form a wireless network and permits wireless devices 12 to communicate over the network or to each other. An example access point 14 is a router that has a broadband network connection. Several access points 14 can link together to form a larger network that allows roaming. The wireless device 12 searches for available access points 14 within range during a background scan process of the exemplary embodiments, as described below.

The wireless device 12 includes at least two independent radio interfaces 16a and 16n (commonly referred to as radio interfaces 16) for processing at least two data streams, a controller 18 coupled to the radio interfaces 16, a memory 20 coupled to the controller 18, and a bus interface unit 22 coupled to the controller 18 and to the memory 20 for transmitting data to a host 24 over a host system bus.

The radio interfaces 16 are independent from each other because each radio interface 16 has its own antenna and RF chain. Each RF chain and its corresponding antenna are responsible for transmitting and processing a data stream. A single frame of data can be broken up and multiplexed across multiple data streams and reassembled at the receiver, which may have the benefits of resolving multipath interference and improving the quality of the received signal.

In one embodiment, the devices in the wireless communication system 10 may have a different number of receive antennas than transmit antennas. An "Y×Z" antenna configuration may be employed, where Y and Z refer to the number of transmitter antennas on a transmitting device and the number of receiver antennas on a receiving device, respectively. At a minimum, the system 10 requires a 2×2 configuration that has two transmit chains and two receive chains, which allows for two data streams multiplexed across a radio link. A common hardware configuration may include two antennas and RF chains on the wireless device 12 to save cost and battery power, while at least three antennas and RF chains are used on the access point 14. This configuration would use 2×3 MIMO for its uplink, and 3×2 MIMO on the downlink.

Each of the radio interfaces 16 may utilize 1 to N radio channels. Each of the channels may be used simultaneously for data transmission. One channel may be designated as the primary channel, and another channel may be designated as a background scan channel. The wireless device 12 may also include multiple operating modes including one or more data modes corresponding to the number of available radio interfaces 16, and a powersave mode.

The driver 26 is software or firmware that controls the radio interfaces 16 and can process the data if needed. The driver 26 is executed by the controller 18. The controller 18 may comprise an ASIC, a DSP or other type of processor. The memory 20 stores the incoming and outgoing data packets and any other data needed by the driver 26. The bus interface unit 22 transfers data between the host system 24, and the controller 18 and the memory 20.

Figure 2:
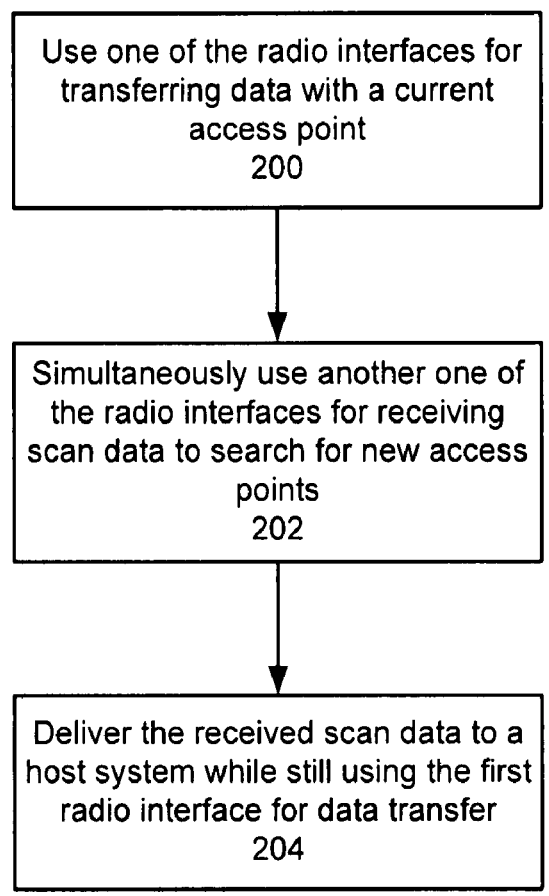
FIG. 2 is a flow diagram illustrating a process performed by a driver for implementing a background scan in a wireless device having at least two independent radio interfaces 16 in accordance with the exemplary embodiment.

FIG. 2 is a flow diagram illustrating a process performed by the driver 26 for implementing a background scan in a wireless device 12 having at least two independent radio interfaces 16 in accordance with the exemplary embodiment. The process begins with the driver 26 using one of the radio interfaces 16a for transferring data with a current access point 14 (block 200). Simultaneously, the driver 26 uses another one of the radio interfaces 16n for receiving scan data to search for new access points (block 202). The driver 26 may then deliver the received scan data to the host system 24 while still using the first radio interface 16a for data transfer (block 204).

Figure 3:
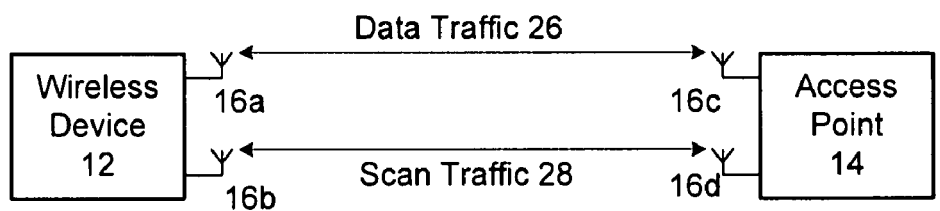
FIG. 3 is a diagram illustrating operation of the background scan process between the wireless device and the access point.

FIG. 3 is a diagram illustrating operation of the background scan process between the wireless device 12 and the access point 14, where like components from FIG. 1 have like reference numerals. The wireless device 12 is shown having two radio interfaces 16a and 16b that transmit and receive data on different channels. Likewise, the access point 14 is shown having two radio interfaces 16c and 16d. The wireless device 12 is shown using first radio interface 16a to transfer data traffic 26 between the radio interface 16c of the access point 14, while the second radio interface 16b is used to receive (and optionally send) scan traffic 28 from/to the radio interface 16d of the wireless access point 14 simultaneously or in parallel with the transfer of the data traffic 26.

As can be seen, the exemplary embodiments eliminate the requirement for the wireless device 12 to entirely stop data traffic in order to perform a background scan. The advantage is that the negative effects on data throughput caused by the background scan to minimized to only a decrease in the data rate, rather than a complete cessation of data traffic.

There are several embodiments for performing the background scan. In one embodiment, when a wireless device 12, which only has two radio interfaces 16 is to perform a background scan, the wireless device 12 signals the access point 14 that the wireless device 12 is entering a mode in which one of the radio interfaces 16 is unavailable for data traffic. In one embodiment, the powersave mode may be used for this purpose. In response, the access point 14 refrains from sending frames of data traffic 26 to the wireless device 12 with data rates that necessitate the wireless device 12 using more than one radio interface 16. The wireless device 12 will then use one of the free radio interfaces 16 to perform the background scan. During the background scan, the wireless device 12 will be able to send data, but on a lower data rate that necessitate the use of only one radio interface 16. When the background scan is complete, the wireless device 12 may signal the access point 14 that it is no longer in powersave mode meaning that all of the wireless device's radio interfaces 14 are available.

In another embodiment, if the wireless device 12 includes multiple radios (e.g. more than two), then the wireless device 12 can signal the access point 14 that only one of those radio interfaces 16 is in powersave mode and that the wireless device 12 will be able to send and receive data using the remaining radio interfaces 16.

In another embodiment, the wireless device 12 does not signal to the access point 14 that one radio interface is unavailable for data traffic, and simply starts using one of the radio interfaces 16 for the background scan. In this case, the wireless device 12 will have to make sure it will not use that radio interface 16 for data traffic while the access point 14 is still sending its data to the device 12 if the access point features auto rate adaptation, since the device 12 will not acknowledge a frame until it is able to receive it properly using the available radios for data traffic.

Figure 4:
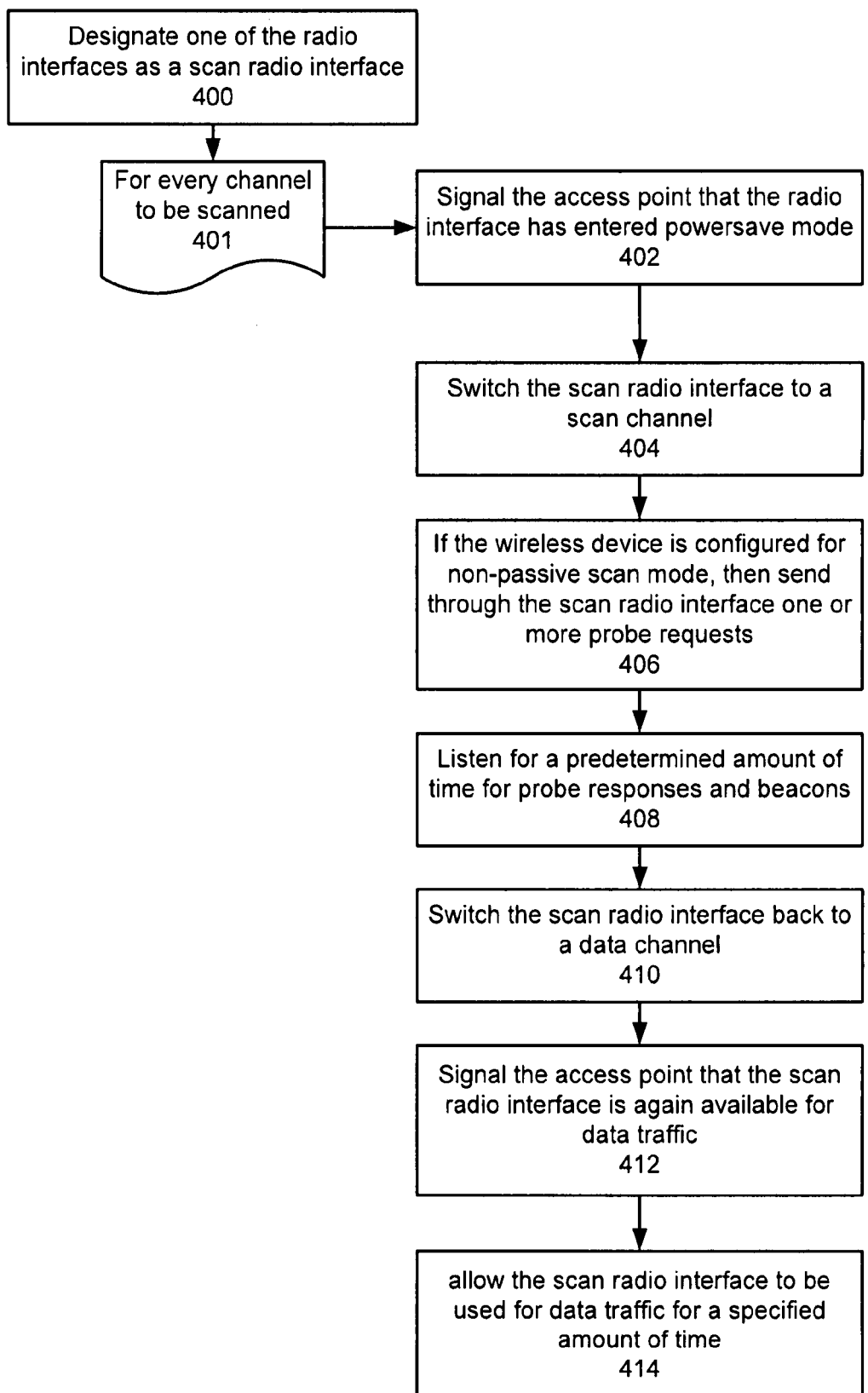
FIG. 4 is a flow diagram illustrating the process performed by the driver for implementing the background scan according to one embodiment.

FIG. 4 is a flow diagram illustrating the process performed by the driver 26 for implementing the background scan according to one embodiment. The process assumes that one of the radio interfaces 16 has been designated a scan radio interface, or that otherwise the driver 26 designates one of the radio interfaces 16 as the scan radio interface (block 400). Then for every channel to be scanned (block 401), the driver 26 signals the access point 14 that the scan radio interface has entered power save mode in which the scan radio interface is unavailable for data traffic (block 402). The driver 26 then switches the scan radio interface to a scan channel (block 404).

If the wireless device 12 is configured for non-passive scan mode, then the driver 26 sends through the scan radio interface 16 one or more probe requests (block 406). The driver 26 then listens for a predefined amount of time for probe responses and beacons (block 408). Thereafter, the driver 26 switches the scan radio interface back to a data channel (block 410). The driver 26 then signals the access point 14 that the scan radio interface is again available for data traffic (block 412). The driver 26 then allows the scan radio interface to be used for data traffic for a specified amount of time (block 414).

Figure 5:
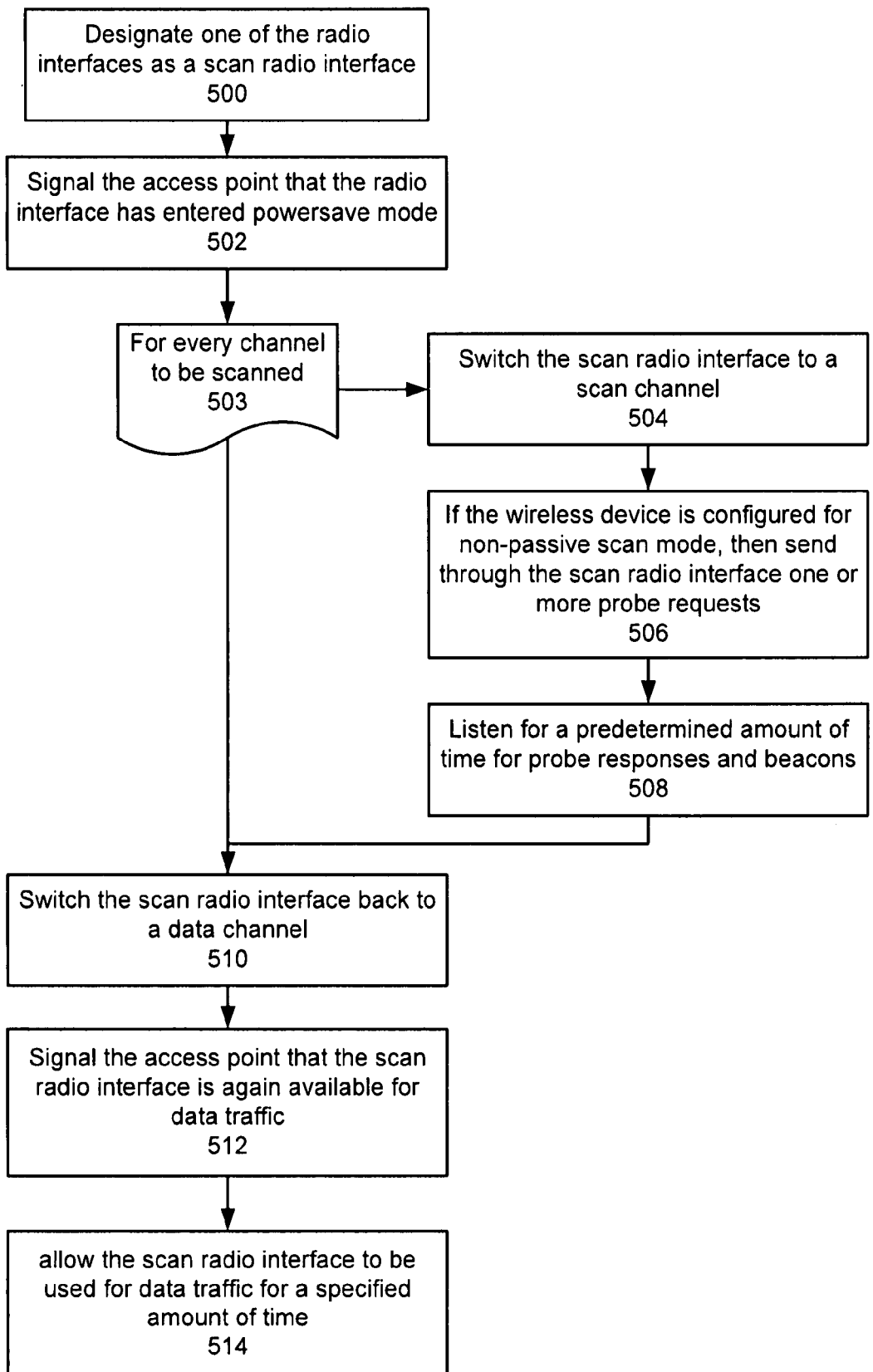
FIG. 5 is a flow diagram illustrating the process performed by the driver for implementing the background scan according to another embodiment.

FIG. 5 is a flow diagram illustrating the process performed by the driver 26 for implementing the background scan according to another embodiment. The process assumes that one of the radio interfaces 16 has been designated a scan radio interface, or that otherwise the driver 26 designates one of the radio interfaces 16 as the scan radio interface (block 500). The driver 26 signals the access point 14 that the scan radio interface has entered power save mode in which scan radio interface is unavailable for data traffic (block 502).

Then, for every channel to be scanned (block 503), the driver 26 switches the scan radio interface to a scan channel (block 504). If the wireless device 12 is configured for non-passive scan mode, then the driver 26 sends through the scan radio interface one or more probe requests (block 506). The driver 26 then listens for a defined amount of time for probe responses and beacons (block 508).

Thereafter, the driver 26 switches the scan radio interface back to the data channel (block 510). The driver 26 then sends to the access point 14 that the scan radio interface is again available for data traffic (block 512). The driver 26 then allows the scan radio interface to be used for data traffic for a specified amount of time (block 514).

A method and system for implementing a background scan in a wireless device having at least two independent radio interfaces has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

I claim:

1. A method for implementing a background scan in a wireless device having at least two independent radio interfaces, the method comprising:
    using a first one of the at least two independent radio interfaces for transferring data with a first access point;
    simultaneously with using the first one of the at least two independent radio interfaces, using a second one of the at least two independent radio interfaces for receiving scan data to search for a second access point;
    signaling the first access point that one of the at least two independent radio interfaces of the wireless device is unavailable for data traffic when the wireless device is to perform the background scan; and
    signaling the first access point that all of the at least two independent radio interfaces of the wireless device are available when the background scan is complete.

2. The method of claim 1, further comprising delivering received scan data to a host while still using the first one of the at least two independent radio interfaces for data transfer.

3. The method of claim 1, wherein the second one of the at least two independent radio interfaces is designated as a scan radio interface, and the method further comprises:
    for every channel to be scanned,
        signaling the first access point that the scan radio interface has entered a first mode in which the scan radio interface is unavailable for data traffic;
        switching the scan radio interface to a scan channel;
        if the wireless device is configured for non-passive scan mode, then sending through the scan radio interface one or more probe requests;
        listening for a predefined amount of time for at least one of a probe response and a beacon;
        switching the scan radio interface back to a data channel;
        signaling the first access point that the scan radio interface is again available for data traffic; and
        allowing the scan radio interface to be used for data traffic for a specified amount of time.

4. The method of claim 1, wherein the second one of the at least two independent radio interfaces is designated as a scan radio interface, and the method further comprises:
    signaling the first access point that the scan radio interface has entered a first mode wherein the scan radio interface is unavailable for data traffic;
    for every channel to be scanned;
        switching the scan radio interface to a scan channel;
        if the wireless device is configured for non-passive scan mode, then sending through the scan radio interface one or more probe requests; and
        listening for a predefined amount of time for at least one of a probe response and a beacon;
    switching the scan radio interface back to a data channel;
    signaling the first access point that the scan radio interface is again available for data traffic; and
    allowing the scan radio interface to be used for data traffic for a specified amount of time.

5. A method for implementing a background scan in a wireless device having at least two independent radio interfaces, the method comprising:
    using a first one of the at least two independent radio interfaces for transferring data with a first access point;
    simultaneously with using the first one of the at least two independent radio interfaces, using a second one of the at least two independent radio interfaces for receiving scan data to search for a second access point; and
    if the wireless device includes additional radio interfaces to the at least two independent radio interfaces, signaling the first access point that only one of the additional radio interfaces is unavailable for data traffic, wherein the wireless device is configured to send and receive data using remaining ones of the additional radio interfaces.

6. A method for implementing a background scan in a wireless device having at least two independent radio interfaces, the method comprising:
    using a first one of the at least two independent radio interfaces for transferring data with a first access point; and
    simultaneously with using the first one of the at least two independent radio interfaces, using a second one of the at least two independent radio interfaces for receiving scan data to search for a second access point, wherein the wireless device does not signal the first access point that one of the at least two independent radio interfaces is unavailable for data traffic.

7. A method for implementing a background scan in a wireless device having at least two independent radio interfaces, the method comprising:
    using a first one of the at least two independent radio interfaces for transferring data with a first access point;

simultaneously with using the first one of the at least two independent radio interfaces, using a second one of the at least two independent radio interfaces for receiving scan data to search for a second access point; and providing a Y×Z antenna configuration, where Y refers to a number of transmitter antennas on the wireless device, and Z refers to a number of receiver antennas on the first access point.

8. The method of claim 7, wherein the Y×Z antenna configuration comprises a 2×2 antenna configuration.

9. The method of claim 8, further comprising providing the wireless device with two first antennas and first radio frequency (RF) chains, and providing the first access point with at least (i) three second antennas and (ii) three second RF chains.

10. A wireless device, comprising:

at least two independent radio interfaces;

a controller coupled to the at least two independent radio interfaces; and a driver executed by the controller, the driver configured for using a first one of the at least two independent radio interfaces for transferring data with a first access point, simultaneously with using the first one of the at least two independent radio interfaces, using a second one of the at least two independent radio interfaces for receiving scan data to search for a second access point, signaling the first access point that one of the at least two independent radio interfaces of the wireless device is unavailable for data traffic when the wireless device is to perform a background scan, and signaling the first access point that all of the at least two independent radio interfaces are available when the background scan is complete.

11. The wireless device of claim 10, wherein the driver delivers received scan data to a host while still using the first of the at least two independent radio interfaces for data transfer.

12. The wireless device of claim 10, wherein the second one of the at least two independent radio interfaces is designated as a scan radio interface, and the driver is further configured for:

for every channel to be scanned, signaling the first access point that the scan radio interface has entered a first mode in which the scan radio interface is unavailable for data traffic;

switching the scan radio interface to a scan channel;

if the wireless device is configured for non-passive scan mode, then sending through the scan radio interface one or more probe requests;

listening for a predefined amount of time for at least one of a probe response and a beacon;

switching the scan radio interface back to a data channel;

signaling the first access point that the scan radio interface is again available for data traffic; and allowing the scan radio interface to be used for data traffic for a specified amount of time.

13. The wireless device of claim 10, wherein the second one of the at least two independent radio interfaces is designated as a scan radio interface, and the driver is further configured for:

signaling the first access point that the scan radio interface has entered a first mode wherein scan radio interface is unavailable for data traffic;

for every channel to be scanned switching the scan radio interface to a scan channel;

if the wireless device is configured for non-passive scan mode, then sending through the scan radio interface one or more probe requests, and listening for a predefined amount of time for at least one of a probe response and a beacon;

switching the scan radio interface back to a data channel;

signaling the first access point that the scan radio interface is again available for data traffic; and allowing the scan radio interface to be used for data traffic for a specified amount of time.

14. The wireless device of claim 10, wherein each of the at least two independent radio interfaces has its own antenna and radio frequency (RF) chain.

15. The wireless device of claim 14, wherein the wireless device comprises a multiple-input/multiple-output (MIMO) device.

16. The wireless device of claim 15, further comprising a Y×Z antenna configuration, where Y refers to a number of transmitter antennas on in the wireless device, and Z refers to a number of receiver antennas on the first access point.

17. The wireless device of claim 16, wherein the Y×Z antenna configuration comprises a 2×2 antenna configuration.

18. The wireless device of claim 17, wherein:

the wireless device includes two first antennas and first radio frequency (RF) chains; and the first access point includes at least three second antennas and three second RF chains.

19. A wireless device, comprising:

at least two independent radio interfaces;

a controller coupled to the at least two independent radio interfaces; and a driver executed by the controller, the driver configured for using a first one of the at least two independent radio interfaces for transferring data with a first access point, simultaneously with using the first one of the at least two independent radio interfaces, using a second one of the at least two independent radio interfaces for receiving scan data to search for a second access point, and if the wireless device includes additional radio interfaces, signaling the first access point that only one of the additional radio interfaces is unavailable for data traffic, wherein the wireless device will be able to still send and receive data using the remaining ones of the additional radio interfaces.

20. A wireless device, comprising:

at least two independent radio interfaces;

a controller coupled to the at least two independent radio interfaces; and a driver executed by the controller, the driver configured for using a first one of the at least two independent radio interfaces for transferring data with a first access point, simultaneously with using the first one of the at least two independent radio interfaces, using a second one of the at least two independent radio interfaces for receiving scan data to search for a second access point, wherein when the second one of the at least two independent radio interfaces is used for a background scan, the driver is not configured to cause the wireless device to signal the first access point that one of the at least two independent radio interfaces is unavailable for data traffic.

* * * * *